United States Patent
Nuggehalli et al.

(10) Patent No.: US 8,111,413 B2
(45) Date of Patent: Feb. 7, 2012

(54) APPROACH FOR SECURELY PRINTING POLICY-ENABLED ELECTRONIC DOCUMENTS BASED ON PRINT DRIVER AND PRINTING DEVICE SUPPORT

(75) Inventors: Jayasimha Nuggehalli, Cupertino, CA (US); Seiichi Katano, Cupertino, CA (US); Seong Kim, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 546 days.

(21) Appl. No.: 12/368,168

(22) Filed: Feb. 9, 2009

(65) Prior Publication Data

US 2010/0202006 A1 Aug. 12, 2010

(51) Int. Cl.
- G06F 3/12 (2006.01)
- G06F 7/04 (2006.01)
- G06F 15/16 (2006.01)
- G06F 17/00 (2006.01)
- G06F 9/44 (2006.01)
- H04N 1/44 (2006.01)
- H04L 9/32 (2006.01)

(52) U.S. Cl. ............ 358/1.14; 726/1; 726/6; 726/18; 719/327

(58) Field of Classification Search ............ 358/1.13, 358/1.14, 1.15, 444, 468; 713/182–184; 726/1–6, 17, 18, 21; 340/5.2, 5.54, 5.74, 340/5.8, 5.81, 5.85; 719/321, 327
See application file for complete search history.

(56) References Cited

U.S. PATENT DOCUMENTS

| | | | |
|---|---|---|---|
| 7,136,176 B2* | 11/2006 | Sugiyama | 358/1.14 |
| 7,271,925 B2* | 9/2007 | Nishiyama | 358/1.14 |
| 7,313,699 B2* | 12/2007 | Koga | 713/182 |
| 7,450,260 B2* | 11/2008 | Takeda et al. | 358/1.15 |
| 7,609,412 B2* | 10/2009 | Maruyama | 358/1.14 |
| 2006/0170947 A1* | 8/2006 | Kurabayashi | 358/1.13 |
| 2007/0127055 A1* | 6/2007 | Kujirai et al. | 358/1.14 |
| 2007/0133044 A1* | 6/2007 | Tanaka | 358/1.15 |
| 2007/0234400 A1* | 10/2007 | Yanagi | 726/1 |
| 2007/0279671 A1* | 12/2007 | Shouno | 358/1.14 |
| 2008/0002225 A1* | 1/2008 | Iwasaki | 358/1.15 |
| 2008/0180723 A1* | 7/2008 | Selvaraj | 358/1.15 |
| 2009/0086252 A1* | 4/2009 | Zucker et al. | 358/1.14 |
| 2009/0097059 A1* | 4/2009 | Iijima | 358/1.15 |
| 2009/0207439 A1* | 8/2009 | Oomura | 358/1.15 |
| 2009/0244594 A1* | 10/2009 | Nuggehalli et al. | 358/1.15 |
| 2009/0316181 A1* | 12/2009 | Shoji et al. | 358/1.15 |
| 2010/0002248 A1* | 1/2010 | Nuggehalli et al. | 358/1.14 |
| 2010/0014110 A1* | 1/2010 | Munetomo | 358/1.14 |
| 2010/0333183 A1* | 12/2010 | Yago | 726/5 |
| 2011/0107396 A1* | 5/2011 | Ozaki | 726/2 |

* cited by examiner

*Primary Examiner* — Scott A Rogers
(74) *Attorney, Agent, or Firm* — Hickman Palermo Truong & Becker LLP; Edward A. Becker

(57) ABSTRACT

An approach is provided for securely printing policy-enabled electronic documents. According to the approach, a determination is made at a client device whether policy-enabled printing has been specified for a particular electronic document. If policy-enabled printing has been specified for the particular electronic document, then a determination is made whether a print driver, installed on the client device for supporting printing for a particular printing device, is configured to support policy-enabled printing. Also, a determination is made whether the particular printing device is currently configured to support policy-enabled printing. The particular electronic document is allowed to be processed at the client device for printing only if both the print driver is configured to support policy-enabled printing and the particular printing device is currently configured to support policy-enabled printing.

15 Claims, 6 Drawing Sheets

USER/PASSWORD ENTRY

USER NAME:

502

POLICY SERVER PASSWORD:

504

DOCUMENT PASSWORD:

506

JOB TYPE:

508

OK    CANCEL

510

APPROACH FOR SECURELY PRINTING POLICY-ENABLED ELECTRONIC DOCUMENTS BASED ON PRINT DRIVER AND PRINTING DEVICE SUPPORT

RELATED APPLICATION DATA

This application is related to U.S. patent application Ser. No. 12/059,836 entitled APPROACH FOR PRINTING POLICY-ENABLED ELECTRONIC DOCUMENTS USING LOCKED PRINTING, filed Mar. 31, 2008; U.S. patent application Ser. No. 12/059,916 entitled APPROACH FOR PROCESSING PRINT DATA USING PASSWORD CONTROL DATA, filed Mar. 31, 2008; U.S. patent application Ser. No. 12/059,986 entitled APPROACH FOR PRINTING POLICY-ENABLED ELECTRONIC DOCUMENTS USING LOCKED PRINTING AND A SHARED MEMORY DATA STRUCTURE, filed Mar. 31, 2008; and U.S. patent application Ser. No. 12/166,741 entitled PRINT DRIVER FOR PRINTING POLICY-ENABLED ELECTRONIC DOCUMENTS USING LOCKED PRINTING, filed Jul. 2, 2008; the contents all of which are incorporated by reference in their entirety for all purposes as if fully set forth herein.

FIELD OF THE INVENTION

This invention relates generally to printing of electronic documents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The proliferation of communications networks, and in particular the Internet, has raised growing concerns about the security of information transmitted over networks. Numerous protection schemes have been implemented to secure electronic documents transmitted over the Internet, ranging from simple passwords to strong encryption. Policy-based solutions have also been developed that allow business organizations to control access to electronic documents. An electronic document for which the access thereto is controlled using a policy is referred to hereinafter as "policy-enabled document." A policy defines the conditions under which a user is granted access to an electronic document. For example, a policy might specify that particular users are allowed access to the electronic document. Alternatively, the policy might specify that all users on a particular project, or all users at a specified level or higher within a business organization, may access the electronic document.

When a user attempts to open the electronic document through an application, the application prompts the user for user credentials, typically in the form of a user ID and password. The user credentials are authenticated to verify the user. Then, the credentials are provided to a policy server along with data that identifies the electronic document that the user is attempting to access. The policy server retrieves a policy associated with the electronic document and then determines, based upon the policy, whether the user should be allowed to access the electronic document. The policy server returns data to the application that indicates whether the user is allowed to access the electronic document. The application selectively allows the user access to the electronic document based upon the data provided by the policy server.

One of the main benefits of the policy-based approach is that the access rights for any number of electronic documents may be changed by changing single policy, without having to change each of the electronic documents. For example, a business organization may change a single policy for a product that may affect access to a hundreds or even thousands of electronic documents.

One of the limitations of using policies to control access to electronic documents is that once a user has been granted access to an electronic document, the electronic document may be distributed to and accessed by other users, either in electronic or printed form. For example, once a user has been granted access to a policy-enabled electronic document and requested that the policy-enabled electronic document be printed, the print data generated by the print driver may no longer contain the data that indicates that the electronic document reflected in the print data is a policy-enabled electronic document. This may occur, for example, when the print driver performs a data conversion or translation, e.g., from Portable Document Format (PDF) to a Printer Command Language (PCL). The result is that third parties intercepting the eavesdroppers can access any portion of the print data. Furthermore, once received by a printing device, the printed data will not be treated as containing a policy-enabled electronic document, since the print data no longer contains the data that indicates that the electronic document reflected in the print data is a policy-enabled electronic document. Based on the foregoing, there is a need for an approach for securely printing policy-enabled electronic documents.

SUMMARY

An approach is provided for securely printing policy-enabled electronic documents. According to the approach, a determination is made at a client device whether policy-enabled printing has been specified for a particular electronic document. If policy-enabled printing has been specified for the particular electronic document, then a determination is made whether a print driver, installed on the client device for supporting printing to a particular printing device, is configured to support policy-enabled printing. Also, a determination is made whether the particular printing device is currently configured to support policy-enabled printing. The particular electronic document is allowed to be processed at the client device for printing only if both the print driver is configured to support policy-enabled printing and the particular printing device is currently configured to support policy-enabled printing.

BRIEF DESCRIPTION OF THE DRAWINGS

In the figures of the accompanying drawings like reference numerals refer to similar elements.

FIG. 5 is an example user interface screen displayed to query the user for this information.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE FOR SECURELY PRINTING POLICY-ENABLED ELECTRONIC DOCUMENTS
III. SECURELY PRINTING POLICY-ENABLED ELECTRONIC DOCUMENTS
IV. IMPLEMENTATION MECHANISMS

I. Overview

An approach is provided for securely printing policy-enabled electronic documents. According to the approach, a determination is made at a client device whether policy-enabled printing has been specified for a particular electronic document. If policy-enabled printing has been specified for the particular electronic document, then a determination is made whether a print driver, installed on the client device for supporting printing to a particular printing device, is configured to support policy-enabled printing. Also, a determination is made whether the particular printing device is currently configured to support policy-enabled printing. The particular electronic document is allowed to be processed at the client device for printing only if both the print driver is configured to support policy-enabled printing and the particular printing device is currently configured to support policy-enabled printing.

This approach ensures that policy-enabled electronic documents are processed for printing when it is known that the policy information specified for the policy-enabled electronic documents will be retained and used during printing.

II. Architecture for Securely Printing Policy-Enabled Electronic Documents

Figure 1:
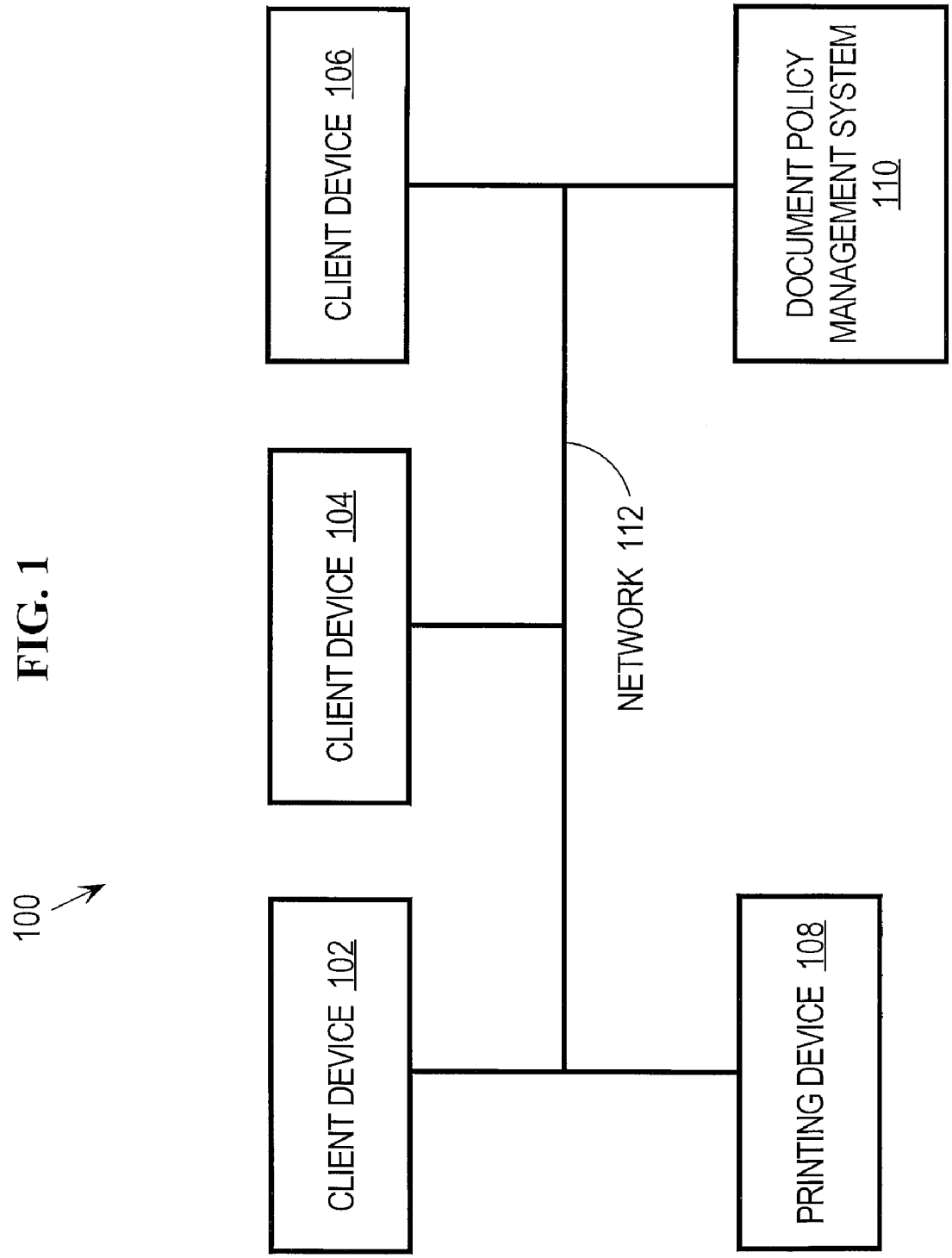
FIG. 1 is a block diagram that depicts an arrangement 100 for securely printing policy-enabled electronic documents.

FIG. 1 is a block diagram that depicts an arrangement 100 for securely printing policy-enabled electronic documents. Arrangement 100 includes client devices 102, 104, 106, a printing device 108 and a document policy management system 110 communicatively coupled via network 112. Client devices 102, 104, 106 may be implemented by any type of client devices. Example implementations of client devices 102, 104, 106 include, without limitation, workstations, personal computers, laptop computers, personal digital assistants (PDAs), cellular telephony devices and any type of mobile devices. In the example arrangement depicted in FIG. 1, it is assumed that client devices 102, 104, 106 are configured with an application program and a print driver that corresponds to printing device 108. Example application programs include, without limitation, a Word processor, a spreadsheet program, an email client and financial software.

The print driver on each client device 102, 104, 106 is configured to process data from the application program and generate print data that is provided to printing device 108 for processing. The print data includes a plurality of print commands which, when processed by the printing device 108, cause a printed version of the electronic document to be generated at the printing device 108. Thus, the application program and the print driver on each client device 102, 104, 106 operate together to generate and provide print data to printing device 108.

The print driver on each client device 102, 104, 106 is also configured to generate a graphical user interface that allows a user to specify attributes of one or more access policies to be applied to an electronic document. Example attributes include, without limitation, a name of an access policy and a location of an access policy. The access policies define what users may access certain electronic documents. For example, an access policy may define that users having certain characteristics, e.g., being at a certain level or being a member of a group or project within an organization, may access an electronic document. The print drivers obtain document policy data from the document policy management system 110 and present the information on the graphical user interface and allow a user to select a particular policy to be applied to an electronic document. As described in more detail hereinafter, the print drivers then include in print data, data that indicates the one or more attributes of the access policies selected by the user. The graphical user interface also allows a user to specify that locked printing is to be used to print a particular electronic document. Client devices 102, 104, 106 may be configured with other mechanisms, processes and functionality, depending upon a particular implementation.

Printing device 108 may be implemented by any type of device that is capable of processing print data and generating printed versions of electronic documents reflected in the print data. For example, printing device 108 may be a multi-function peripheral (MFP) that includes any combination of printing, copying, facsimile and scanning capability, etc. Document policy management system 110 is an entity that stores and manages access policies and is capable of determining, based upon a policy, whether a user is authorized to print an electronic document. For example, given a user ID, password and identification of an electronic document, document policy management system 110 is able to determine whether, based upon a policy, the user is authorized to print the electronic document.

Network 112 may be implemented by any type of medium and/or mechanism (wired or wireless) that facilitates the exchange of information between the client devices 102, 104, 106 and printing device 108. Furthermore, network 112 may use any type of communications protocol and may be secured or unsecured, depending upon the requirements of a particular application. Note that although arrangement 100 includes a single printing device 108, the approach is applicable to any number of printing devices. Also, although the document policy management system 110 is depicted in FIG. 1 as a separate network entity, the functionality of the document policy management system 110 may be co-resident on other devices, such as client devices 102, 104, 106 and printing device 108.

Figure 2:
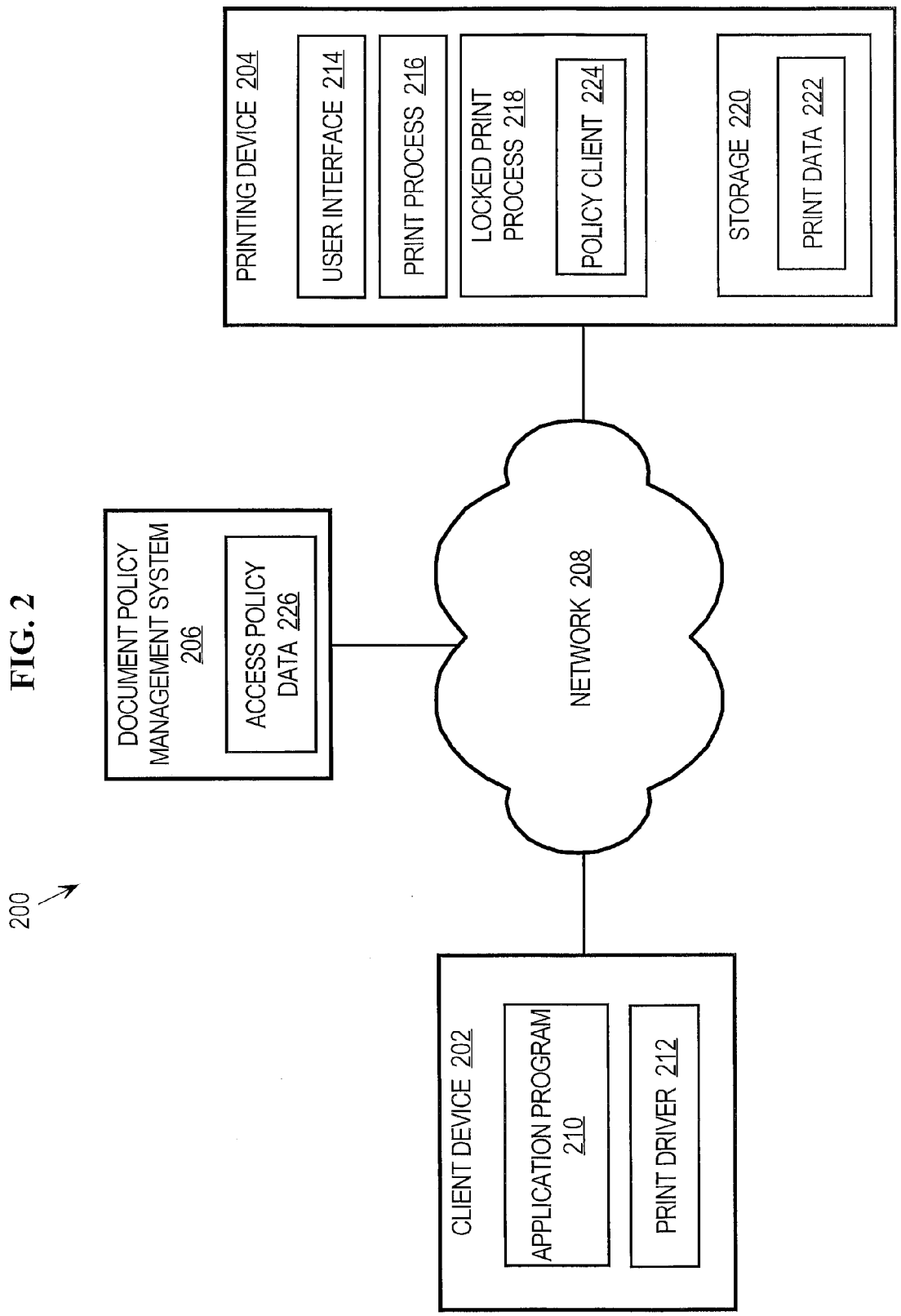
FIG. 2 is a block diagram of an arrangement for securely printing policy-enabled electronic documents according to one embodiment of the invention.

FIG. 2 is a block diagram of an arrangement 200 for securely printing policy-enabled electronic documents according to one embodiment of the invention. Arrangement 200 is similar to arrangement 100, except that only a single client device is depicted, for purposes of explanation, and additional details are depicted for the various elements. Arrangement 200 includes a client device 202, a printing device 204 and a document policy management system 206 that are communicatively coupled via a network 208. Client device 202 includes an application program 210 and a print driver 212.

Printing device 204 is configured with a user interface 214, a print process 216, a locked print process 218 and storage 220 that stores print data 222. User interface 214 may be any mechanism and/or medium that provides for the exchange of information between a user and printing device 204. Examples of user interface 214 include, without limitation, a control panel with a display and keypad or keyboard, a cathode ray tube (CRT), a liquid crystal display (LCD), a keyboard, touchpad, mouse, trackball, a microphone and speakers, and any combination thereof. Printing device 204 may be configured to display information on user interface 214 in any number of languages, depending upon a particular implementation. As with conventional printing devices, the user interface 214 on printing device 204 may provide limited capability to easily enter alphanumeric strings.

Print process 216 may be implemented by one or more processes for processing print data received from client device 202 and for generating a printed version of an electronic document reflected in the print data. Print process 216 and locked print process 218 may be implemented as resident processes on printing device 204. Alternatively, print process 216 and locked print process 218 may be made available to printing device 204 on a removable media or may be implemented at a remote location with respect to printing device 204. Locked print process may be implemented by one or more processes for providing locked print services on printing device 204. Locked print process 218 may include a policy client 224 that interacts with the document policy management system 206, as described in more detail hereinafter. The document policy management system 206 includes access policy data 226 that defines one or more access policies that may be applied to electronic documents to control user access to the electronic documents on printing device 204. For example, suppose that a particular user requests access to particular print data stored in print data 222. The particular print data may represent a particular locked print job stored at printing device 204. The user typically enters user credentials, for example a user ID and password, via user interface 214. After the user credentials are verified, policy client 224 contacts document policy management system 206 to determine whether the user is authorized, based upon a policy reflected in access policy data 226, to access the particular print data. This may include policy client 224 sending to document policy management system 206 data that indicates the user and the particular print data. Document policy management system 206 determines, based upon access policy data, whether the user is authorized to access the particular print data and informs policy client 224. For example, suppose that an access policy reflected in access policy data 226 specifies that a user must be at an executive employment level to access the particular print data. Document policy management system 206 determines whether the user has the required employment level of at least executive. If so, then the user is authorized to access the particular print data. Once the determination has been made, locked print process 218 then grants the user access to the particular print data, e.g., to print the particular print data, if the user is authorized to access the particular print data.

Storage 220 may be implemented by any type of storage, including volatile storage, non-volatile storage, or any combination of volatile and non-volatile storage. Examples of storage 220 include, without limitation, random access memory (RAM) and one or more disks. User interface 214, print process 216, locked print process 218 and storage 220 may be implemented in hardware, software, or any combination of hardware or software, depending upon a particular implementation.

In arrangement 200, a user generates or accesses an existing electronic document via application program 210. Example application programs include, without limitation, a Word processor, a spreadsheet program, an email client and financial software. The user indicates a desire to print the electronic document via a graphical user interface generated by application program 210. Print driver 212 generates a graphical user interface that allows a user to specify attributes of one or more access policies to be applied to an electronic document. Print driver 212 may obtain document policy data from the document policy management system 110 that identifies available policies and/or policy attributes. Print driver 212 displays the available polices and attributes on a graphical user interface and the user selects one or more policies and/or attributes to be applied to the electronic document.

For example, suppose that the electronic document contains sensitive or confidential information. The user may specify that only users of a particular executive employee group are allowed to print the electronic document by specifying that an executive employee group policy be applied to the electronic document. The graphical user interface also allows a user to specify that locked printing is to be used to print a particular electronic document. Print driver 212 generates print data that includes print data that indicates the one or more attributes of the access policies selected by the user. For example, the print data may include information that indicates one or more attributes of one or more access policies to be applied to the electronic document. For example, the print data may include an APSPASSWORD command indicating that the electronic document contained in the print data is a policy-enabled electronic document. As another example, the print data may include a PDFPASSWORD command indicating that the electronic document contained in the print data is a password protected PDF document. The following Printer Job Language (PJL) headers are examples of data that may be included with the print data to indicate that access policies are applied to the electronic data:

@PJL POLICYSERVERURL="https://..../policyservices"
@PJL POLICYSERVERUSERID=" ..."
@PJL POLICYSSERVERPASSWORD=..... [This information may be encrypted]

In this example, the PJL headers indicate the URL of document policy management system 206, a policy server user ID and a policy server password. Document policy management system 206 manages the access policies used to control access to the electronic document. The policy server user ID and policy server password are used by document policy management server 206 to authenticate the user. In addition to the foregoing example PJL headers, other PJL headers may be included to specify the particular access policies selected by a user. If the print driver supports policy-enabled printing, then the example foregoing information associated with the electronic document to be printed will be included in or with the print data generated by the print driver, so that the policy can be applied by the printing device. As previously described herein, the approach may be used in conjunction with locked printing. Therefore, in situations where a user designated locked printing, the print data also includes data that indicates that locked printing has been specified for the electronic document.

The data indicating that an electronic document is a policy-enabled electronic document, as well as other information such as whether locked printing is to be used, may be contained in a header portion of the print data, in the body portion of the print data, or any combination of a header portion and body portion of the print data. For example, in some implementations, the application that generates the print data in conjunction with a print driver may create a header that is appended to the print data and the header contains one or more commands that indicate that the electronic document contained in the print data is a policy-enabled electronic document. According to one embodiment of the invention, the presence in the print data of an APSPASSWORD command indicates that the electronic document is a policy-enabled electronic document.

Print driver 212 then causes the print data to be transmitted over network 208 to printing device 204 where the print data 222 is stored on storage 220 and managed as locked print data. A user then logs into printing device 204 and is authenticated. For example, the user may be queried to enter a user ID and password via user interface 214 and the user ID and password are verified by locked print process 218. Policy client 224 interacts with document policy management system 206 to determine the policies that the user satisfies. For example, policy client 224 may transmit the user ID to document policy management system 206 which, based upon access policy data 226, identifies one or more groups that the user is a member of and/or one or more policies that the user satisfies. Locked print process 218 then grants the user access to print data 222 based upon the user credentials and the policies applied to the print data 222. Referring to the prior example, suppose that the user is an executive of a business organization. Policy client 224 supplies the user ID to document policy management system 206 and receives data that indicates the authorized policies for that user ID which, in the present example, includes an executive level policy. Locked print process 218 determines which print data 222 the user is allowed to print based upon the user being allowed to access print data 222 having an executive level policy or lower and generates data on a graphical user interface, e.g., on user interface 214, that indicates the electronic documents that the user is allowed to print. The user selects one or more of the electronic documents for printing and the electronic documents are printed. As an alternative, policy client 224 may provide to document policy management system 206 the user ID and policies specified for print data 222 and receive data indicating which policies the user satisfies.

Figure 3:
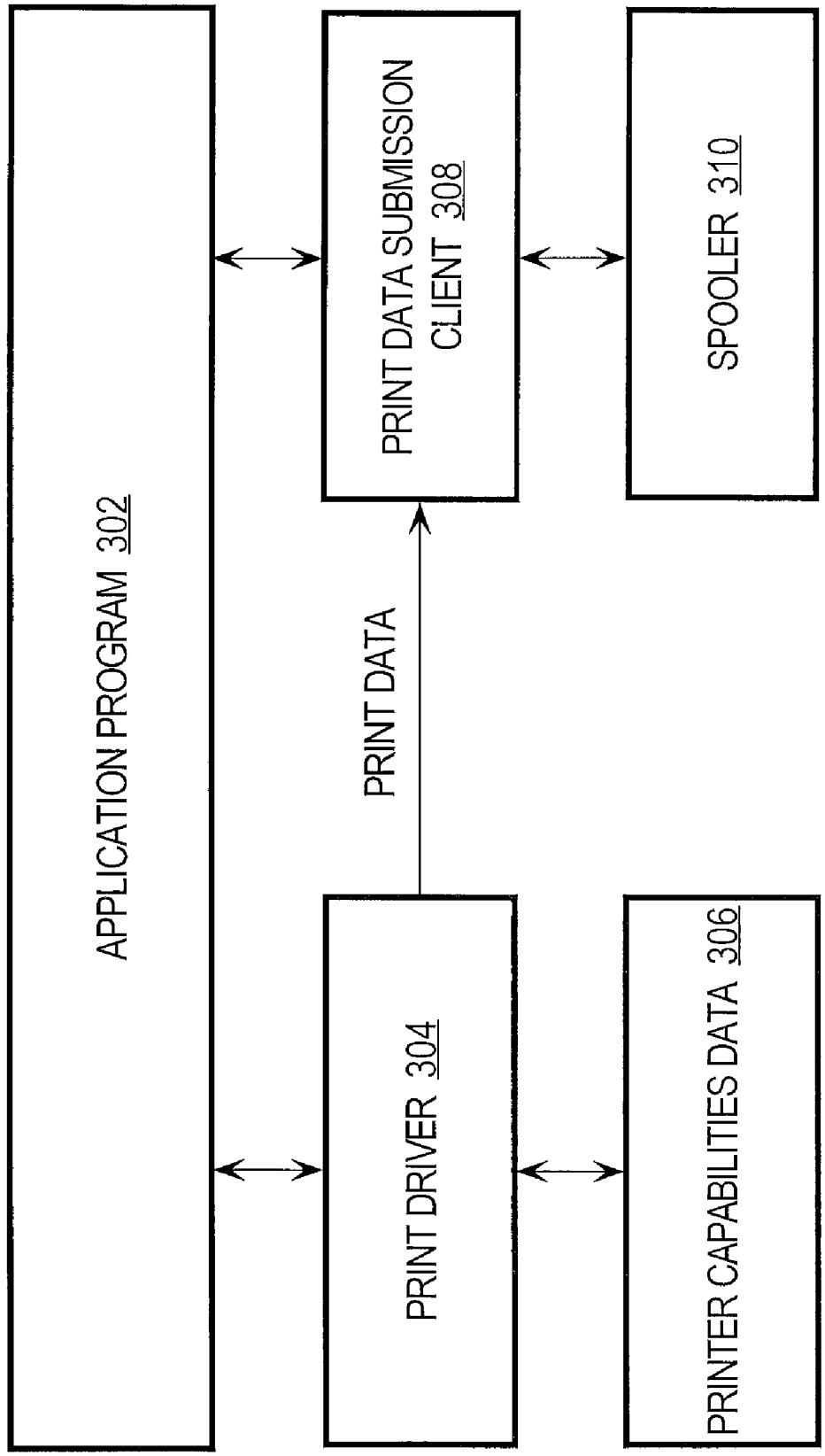
FIG. 3 is a data flow diagram that depicts relationships between various client processes executing on a client device.

FIG. 3 is a data flow diagram 300 that depicts relationships between various example client processes executing on a client device, such as client device 202. In this example, a client device includes an application program 302, a print driver 304, printer capabilities data 306, a print data submission client 308 and a spooler 310. Application program 302 may correspond to application program 210 and print driver 304 may correspond to print driver 212 in FIG. 2. The printer capabilities data 306, print data submission client 308 and spooler 310 are not depicted in FIG. 2 for purposes of explanation, but might also be implemented on client device 202. Application program 302 generates and provides application data to print driver 304. Print driver 304 processes the application data in conjunction with printer capabilities data 306 and generates print data that is in a format understood by a target printing device that was selected by a user through application program 302. Printer capabilities data 306 is data that describes the current capabilities of the target printing device. In the context of Postscript printing, an example of print driver 304 is a Postscript print driver and an example of printer capabilities data 306 is a Postscript Printer Description (PPD) file.

Print data submission client 308 receives the print data from print driver 304 and adds policy and security information received from application program 302. For example, print data submission client 308 may add policy and security information to a job control header in the print data. Print data submission client 308 provides the modified print data to spooler 310, which queues and transmits the modified print data to the target printing device.

III. Securely Printing Policy-Enabled Electronic Documents

Figure 4:
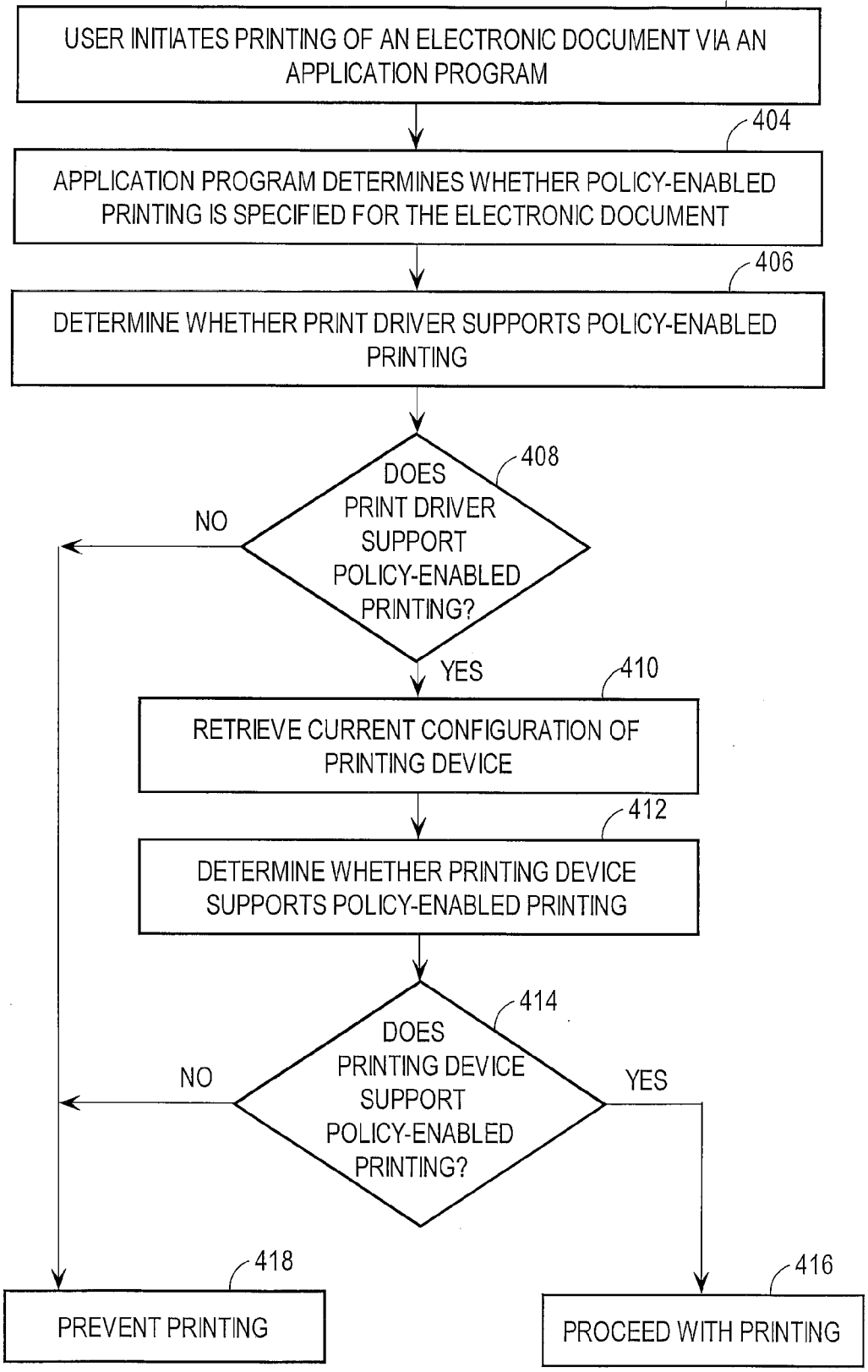
FIG. 4 is a flow diagram that depicts an approach for securely printing a policy-enabled electronic document.

FIG. 4 is a flow diagram 400 that depicts an approach for securely printing a policy-enabled electronic document. In step 402, a user initiates printing of an electronic document. For example, a user may create a word processing document using application program 210 (in the context of application program 210 being a word processor) and initiate printing of the electronic document. The electronic document may be in a particular format, for example PDF. A user typically initiates printing of an electronic document by selecting one or more graphical user interface objects, such as buttons and menus. A user will typically also select a target printing device on which the electronic document is to be printed. The user may also apply various protections and controls that apply to the printing of the electronic document. For example, the user may apply a policy to the electronic document that specifies that only individuals who are members of a particular group may print the electronic document. The particular group may represent a group within a business organization, such as a department, a project team, or an executive level. Policies are typically applied by a user selecting one or more user interface objects that indicate attributes of a policy. Once the print data is received by printing device 204, the print data 222 is stored on storage 220 and access to print data 222 is managed by locked print process 218. A user enters user credentials, e.g., a user ID and password, via user interface 214. The user credentials are verified and the user is given access to, e.g., the ability to print, certain stored print data 222 based upon the access policy data 226.

In step 404, the application program determines whether policy-enabled printing is specified for the electronic document. This may be determined, for example, by the application program recognizing that the user has specified that a particular policy is to be applied to the electronic document. Alternatively, the application program may examine metadata associated with the electronic document that indicates that policy-enabled printing has been specified for the electronic document.

In the present example, it is presumed that policy-enabled printing has been specified for the electronic document. In step 406, a determination is made whether the print driver 212 supports policy-enabled printing. In the context of printing electronic documents in PDF, this may include, for example, determining whether the print driver 212 supports direct PDF printing. If print driver 212 does support policy-enabled printing, then data related to policy-enabled printing will be preserved by print driver 212 and included in or with the print data generated by print driver 212 and transmitted to printing device 204.

If, in step 408, a determination is made that print driver 212 supports policy-enabled printing, then in step 410 the current configuration of printing device 204 is retrieved. The current configuration of printing device 204 may be reflected in configuration data stored on client device 202. The current configuration of printing device 204 may also be retrieved from printing device 204. For example, application program 210 or print driver 212 may generate and transmit to printing device 204 a request for configuration data. Printing device 204 supplies the configuration data in response to the request. The configuration data specifies the current configuration of printing device 204 including, for example, whether printing device 204 currently supports policy-enabled printing.

In step 412, a determination is made whether the printing device supports policy-enabled printing. This may be performed, for example, by examining the configuration data retrieved from printing device 204. If, in step 414, a determination is made that the printing device supports policy-enabled printing, then in step 416, printing proceeds. This typically includes querying the user for information related to a policy to be applied to the electronic document. FIG. 5 is an example user interface screen 500 displayed to query the user for this information. User interface screen 500 includes a user name field 502 for a policy server, or in the present example, for document policy management system 206. User interface screen 500 also includes a policy server password field 504 and a document password field 506. User interface screen 500 also includes a job type field 508 for specifying a print job as being, for example, a normal print job or a locked print job. User interface screen 500 includes example user interface fields for purposes of explanation. The particular fields used may vary, depending upon the requirements of a particular implementation.

Returning to FIG. 4, if in step 408, the printer driver does not support policy-enabled printing or, if in step 414, the printing device does not support policy-enabled printing, then in step 418, printing of the electronic document is prevented.

IV. Implementation Mechanisms

Figure 6:
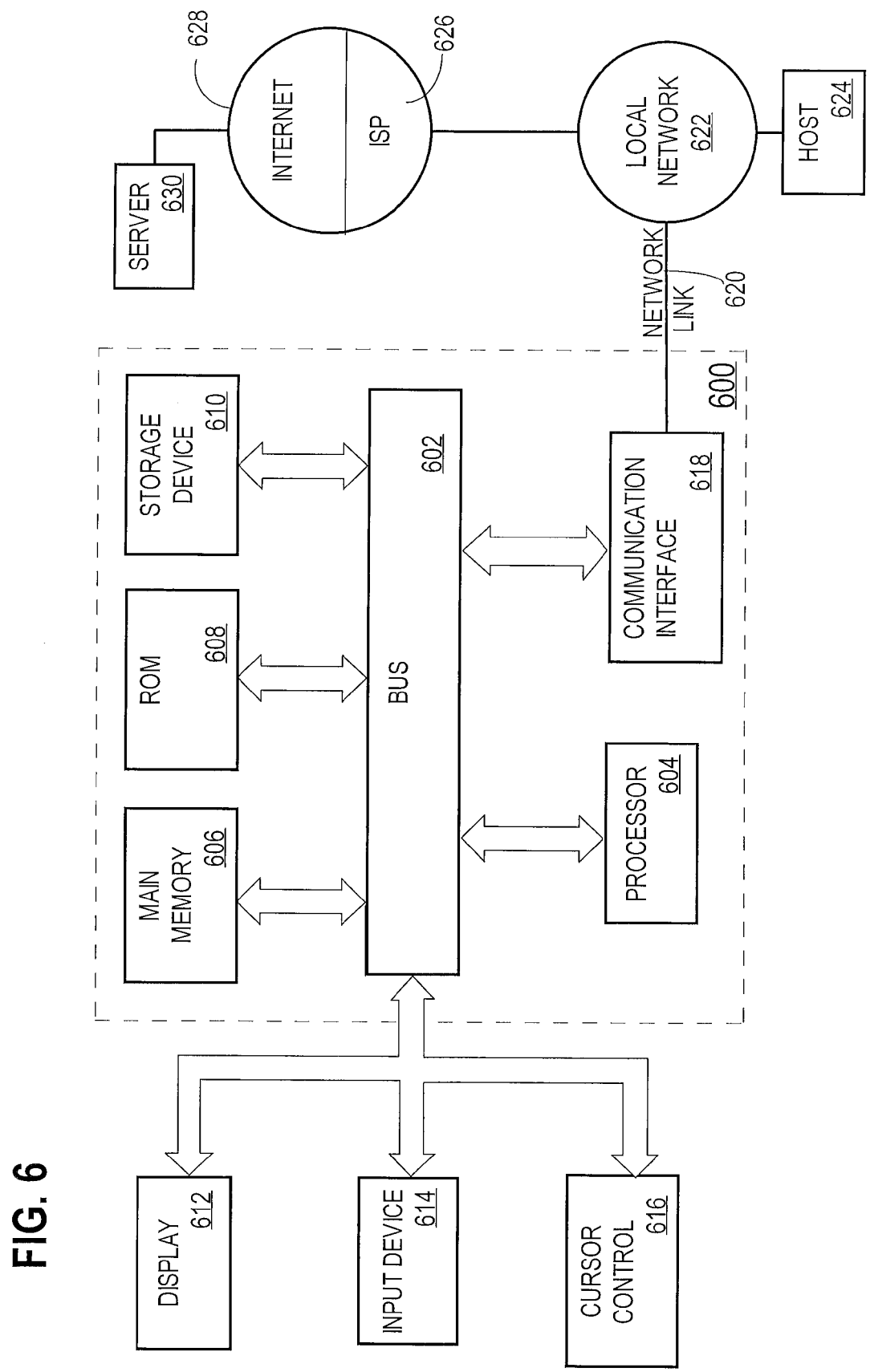
FIG. 6 is a block diagram of a computer system on which embodiments of the invention may be implemented.

The approach described herein for printing policy-enabled electronic documents using locked printing may be implemented on any type of computing platform or architecture. For purposes of explanation, FIG. 6 is a block diagram that depicts an example computer system 600 upon which embodiments of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for securely printing policy-enabled electronic documents, the computer-implemented method comprising:
   at a client device determining whether policy-enabled printing has been specified for a particular electronic document; and
   if policy-enabled printing has been specified for the particular electronic document, then
      determining whether a print driver, installed on the client device for supporting printing for a particular printing device, is configured to support policy-enabled printing,
      determining whether the particular printing device is currently configured to support policy-enabled printing, and
      allow the particular electronic document to be processed at the client device for printing only if both the print driver is configured to support policy-enabled printing and the particular printing device is currently configured to support policy-enabled printing.

2. The computer-implemented method as recited in claim 1, wherein:
   determining whether the print driver is configured to support policy-enabled printing includes determining whether the print driver is configured to support direct PDF printing, and
   allowing the particular electronic document to be processed at the client device for printing only if both the print driver is configured to support policy-enabled printing and the particular printing device is currently configured to support policy-enabled printing includes allowing the particular electronic document to be processed at the client device for printing only if both the print driver is configured to support direct PDF printing and the particular printing device is currently configured to support policy-enabled printing.

3. The computer-implemented method as recited in claim 1, further comprising the computer-implemented step of the print driver retrieving from the particular printing device configuration data that indicates whether the particular printing device is currently configured to support policy-enabled printing.

4. The computer-implemented method as recited in claim 1, wherein determining whether a print driver, installed on the client device for supporting printing for a particular printing device, is configured to support policy-enabled printing includes determining whether when, the print driver processes the electronic document and generates print data, data that indicates that one or more policies are to be applied to the particular electronic document at the particular printing device will be included in the print data.

5. The computer-implemented method as recited in claim 1, wherein determining whether the particular printing device is currently configured to support policy-enabled printing includes determining whether when, the particular printing device processes print data generated by the print driver, that one or more policies specified for the electronic document will be applied to control printing of the electronic document at the particular printing device.

6. A non-transitory computer-readable medium for securely printing policy-enabled electronic documents, the computer-readable medium storing instructions which, when processed by one or more processors, causes:
   at a client device determining whether policy-enabled printing has been specified for a particular electronic document; and
   if policy-enabled printing has been specified for the particular electronic document, then
      determining whether a print driver, installed on the client device for supporting printing for a particular printing device, is configured to support policy-enabled printing,
      determining whether the particular printing device is currently configured to support policy-enabled printing, and
      allow the particular electronic document to be processed at the client device for printing only if both the print driver is configured to support policy-enabled printing and the particular printing device is currently configured to support policy-enabled printing.

7. The non-transitory computer-readable medium as recited in claim 6, wherein:
   determining whether the print driver is configured to support policy-enabled printing includes determining whether the print driver is configured to support direct PDF printing, and
   allowing the particular electronic document to be processed at the client device for printing only if both the print driver is configured to support policy-enabled printing and the particular printing device is currently configured to support policy-enabled printing includes allowing the particular electronic document to be processed at the client device for printing only if both the print driver is configured to support direct PDF printing and the particular printing device is currently configured to support policy-enabled printing.

8. The non-transitory computer-readable medium as recited in claim 6, further comprising additional instructions which, when processed by the one or more processors, causes the computer-implemented step of the print driver retrieving from the particular printing device configuration data that indicates whether the particular printing device is currently configured to support policy-enabled printing.

9. The non-transitory computer-readable medium as recited in claim 6, wherein determining whether a print driver, installed on the client device for supporting printing for a particular printing device, is configured to support policy-enabled printing includes determining whether when, the print driver processes the electronic document and generates print data, data that indicates that one or more policies are to be applied to the particular electronic document at the particular printing device will be included in the print data.

10. The non-transitory computer-readable medium as recited in claim 6, wherein determining whether the particular printing device is currently configured to support policy-enabled printing includes determining whether when, the particular printing device processes print data generated by the print driver, that one or more policies specified for the electronic document will be applied to control printing of the electronic document at the particular printing device.

11. A client device comprising:
   a user interface configured to display information to users and receive user input from the users;
   an application program configured to:
      determine whether policy-enabled printing has been specified for a particular electronic document;
      if policy-enabled printing has been specified for the particular electronic document, then
         determine whether a print driver, installed on the client device for supporting printing for a particular printing device, is configured to support policy-enabled printing, and
         allow the print driver to process the particular electronic document for printing only if the print driver is configured to support policy-enabled printing; and
   wherein the print driver is configured to determine whether the printing device is currently configured to support policy-enabled printing and process the particular electronic document for printing only if the printing device is configured to support policy-enabled printing.

12. The client device as recited in claim 11, wherein:
   determining whether the print driver is configured to support policy-enabled printing includes determining whether the print driver is configured to support direct PDF printing,
   allowing the print driver to process the particular electronic document for printing only if the print driver is configured to support policy-enabled printing application program includes allow the print driver to process the particular electronic document for printing only if the print driver is configured to support direct PDF printing.

13. The client device as recited in claim 11, wherein the print driver is further configured to query the particular printing device currently configured to support policy-enabled printing.

14. The client device as recited in claim 11, wherein determining whether the print driver, installed on the client device for supporting printing for a particular printing device, is configured to support policy-enabled printing includes determining whether when, the print driver processes the electronic document and generates print data, data that indicates that one or more policies are to be applied to the particular electronic document at the particular printing device will be included in the print data.

15. The client device as recited in claim 11, wherein determining whether the particular printing device is currently configured to support policy-enabled printing includes determining whether when, the particular printing device processes print data generated by the print driver, that one or more policies specified for the electronic document will be applied to control printing of the electronic document at the particular printing device.

* * * * *